Feb. 24, 1942.        R. SELLER        2,274,219
HOLDER FOR SPOONS AND THE LIKE
Filed July 24, 1939
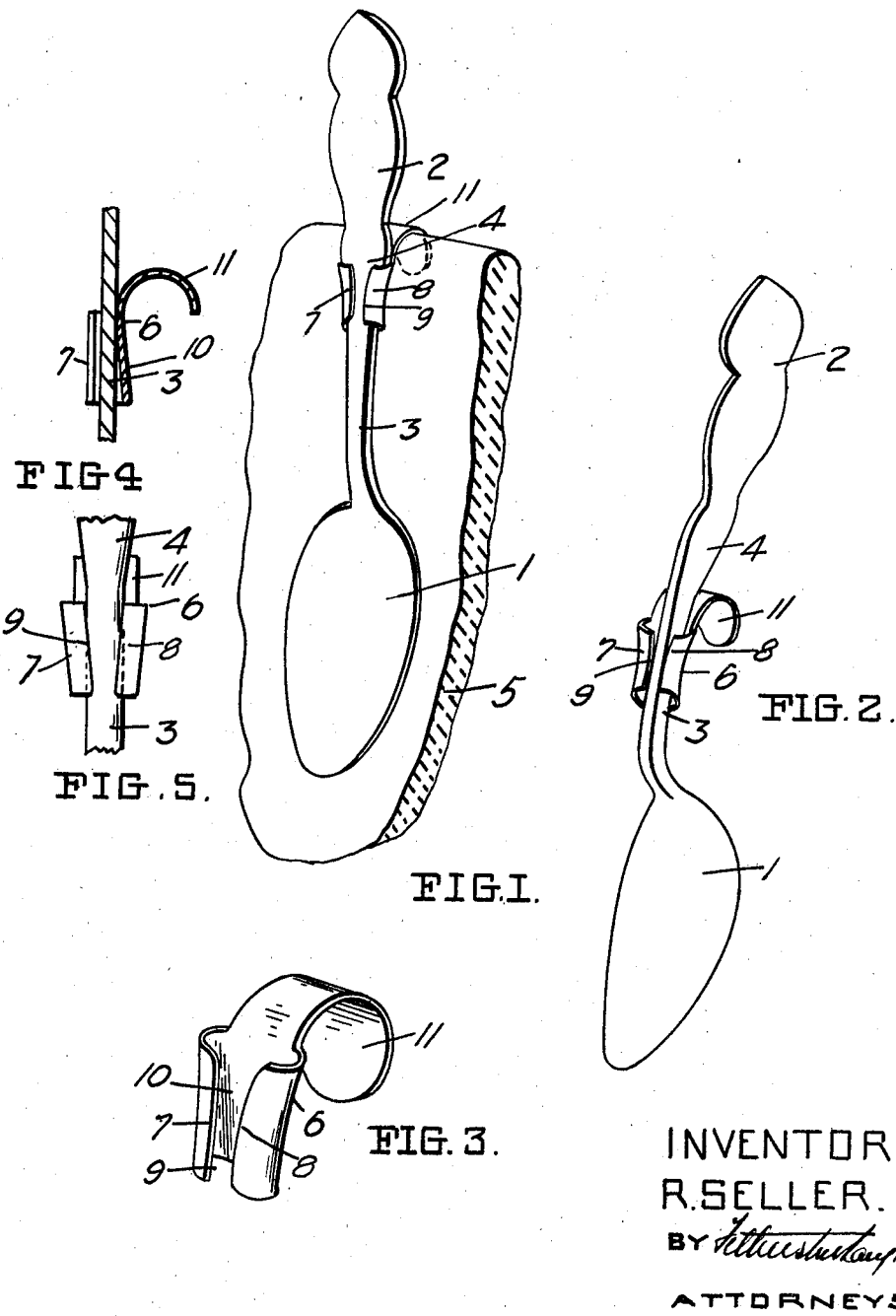
INVENTOR
R. SELLER.
BY
ATTORNEYS Patented Feb. 24, 1942

2,274,219

UNITED STATES PATENT OFFICE 2,274,219

HOLDER FOR SPOONS AND THE LIKE

Russell Seller, Simcoe, Ontario, Canada

Application July 24, 1939, Serial No. 286,187

1 Claim. (Cl. 65—65)

My invention relates to improvements in holders for spoons and the like and the object of the invention is to devise simple means whereby a spoon or other article may be held at the side of a bowl or other receptacle without sliding down into the bowl contents so that the handle thereof is covered with such contents and the fingers of the user soiled in taking hold of the submerged spoon handle to lift it from the bowl, and it consists essentially in the arrangement and construction of parts as hereafter explained.

Fig. 1 is a perspective view of a spoon together with a fragmentary portion of a bowl and my holder applied thereto.

Fig. 2 is a perspective view of a spoon and holder showing the spoon in the position it assumes when being applied to the holder.

Fig. 3 is a perspective detail of the holder.

Fig. 4 is a sectional detail through the holder and adjacent parts of the spoon.

Fig. 5 is a front elevation of the parts illustrated in Fig. 4.

In the drawing like characters of reference indicate corresponding parts in the different views.

1 indicates a spoon provided with a handle 2 having a narrow portion 3 and a tapering portion 4. 5 is a fragmentary portion of a bowl.

6 is my spoon holder tapered from its upper end and provided with incurved lips 7 and 8 forming a front tapered slot 9 the edges of which diverge upwardly and outwardly. The back wall 10 of the holder is inclined downwardly away from the lips 7 and 8.

11 is a curved lip forming a hook adapted to engage the upper edge of the bowl 5.

In applying my holder to the spoon, the spoon is turned to a position at right angles to that shown in Fig. 1 and as illustrated in Fig. 2. When the spoon is in this position the narrowest portion of the handle stem is passed through the slot 9 and then turned through a 90° angle the wide upper end of the slot 9 and outwardly inclined lower end of the back wall allowing sufficient room within the holder to permit of this turning movement.

When the spoon is turned as above described the holder is moved upward longitudinally of the handle until the tapered portion 4 of the handle enters the tapered up end of the holder thereby supporting the spoon.

After the spoon has been in use to remove some of the bowl contents, the hook 11 is dropped into engagement with the upper edge of the bowl as shown in Fig. 1, to support the spoon and prevent it slipping down into the contents of the bowl which it very easily does, particularly if such contents are liquid and the bowl has a rounded bottom merging into the side wall thereof.

What I claim as my invention is:

A holder for a spoon having a handle formed with a wide upper portion tapering to a narrow lower portion adjacent the bowl and comprising a body in the form of a flattened downwardly tapering tube, the rear wall of which inclines outward from the top to the bottom of the tube and having a downwardly tapering slot in its front wall and a supporting hook extending from the upper edge of the back wall.

RUSSELL SELLER.